(12) United States Patent  (10) Patent No.: US 8,788,145 B2
Perugu et al.  (45) Date of Patent: Jul. 22, 2014

(54) DETERMINATION OF SUN RAYS INSIDE A VEHICLE

(75) Inventors: Bhupal R. Perugu, Kurnool District (IN); Todd M. Tumas, Taylor, MI (US); Narayana Bhyravajhul, Akkayyapalem (IN); Lee E. Krispin, Rochester Hills, MI (US); Gilles M. Delorme, Whitby, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 119 days.

(21) Appl. No.: 13/464,694

(22) Filed: May 4, 2012

(65) Prior Publication Data

US 2013/0297146 A1 Nov. 7, 2013

(51) Int. Cl.
*G06F 7/00* (2006.01)
(52) U.S. Cl.
USPC .............................................. 701/36; 236/1 B
(58) Field of Classification Search
USPC ............... 701/36, 431, 484, 516; 340/426.26, 340/426.28, 461, 425.5; 342/357.31, 457; 236/49.3, 113, 91 C, 91 F, 43, 1 B; 165/202, 203, 42, 43, 11.1
See application file for complete search history.

(56) References Cited

U.S. PATENT DOCUMENTS

| | | | | |
|---|---|---|---|---|
| 5,553,661 | A * | 9/1996 | Beyerlein et al. | 165/203 |
| 2006/0006685 | A1 * | 1/2006 | Shibukawa et al. | 296/39.1 |
| 2007/0131782 | A1 | 6/2007 | Ziehr et al. | |
| 2008/0046151 | A1 * | 2/2008 | Ziehr | 701/49 |

* cited by examiner

*Primary Examiner* — Marthe Marc-Coleman
(74) *Attorney, Agent, or Firm* — Ingrassia Fisher & Lorenz, P.C.

(57) ABSTRACT

Methods, systems, and vehicles are provided for determining the sun's rays inside a vehicle. A communication device is configured to obtain information as to a current angle of the sun. A process is coupled to the communications device. The processor is configured to define a ray from a point of interest inside the vehicle toward the sun using the information and determine whether the ray intersects a transparent surface of the vehicle, for use in determining whether the point of interest is irradiated by rays of the sun if the ray intersects the transparent surface.

20 Claims, 4 Drawing Sheets

DETERMINATION OF SUN RAYS INSIDE A VEHICLE

TECHNICAL FIELD

The present disclosure generally relates to the field of vehicles and, more specifically, to methods and systems for determining the presence of the sun's rays inside a vehicle.

BACKGROUND

Many vehicles include devices or systems that can be impacted by the sun's rays inside the vehicle. For example, vehicle environmental control systems may need to operate in a different manner if the sun's rays are present and impinging on different interior surfaces inside the vehicle. By way of further example, the display associated with vehicle navigation systems and/or infotainment systems may also be affected by the sun's rays.

Accordingly, it is desirable to provide improved methods for determining the sun's rays' impingement on defined interior surfaces inside a vehicle. It is also desirable to provide improved systems for such determining of the sun's rays' impingement. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises the steps of obtaining information as to a current angle of the sun and defining a ray from a point of interest inside a vehicle toward the sun using the information. The method then determines whether the ray intersects a transparent surface of the vehicle and whether the point of interest is irradiated by rays of the sun if the ray intersects the transparent surface.

In accordance with another exemplary embodiment, a system is provided. The system comprises a communication device and a processor. The communication device is configured to obtain information as to a current angle of the sun. The processor is coupled to the communications device, and is configured to define a ray from a point of interest inside a vehicle toward the sun using the information and to determine whether the ray intersects a transparent surface of the vehicle. The processor also determines whether the point of interest is irradiated by rays of the sun if the ray intersects the transparent surface.

In accordance with a further exemplary embodiment, a vehicle is provided. The vehicle comprises a body, a drive system, and a controller. The drive system is disposed inside the body. The controller is disposed inside the body. The controller comprises a communication device and a processor. The communication device is configured to obtain information as to a current angle of the sun. The processor is coupled to the communication device. The processor is configured to define a ray from a point of interest inside the vehicle toward the sun using the information and determine whether the ray intersects a transparent surface of the vehicle, and then determining whether the point of interest is irradiated by rays of the sun if the ray intersects the transparent surface.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
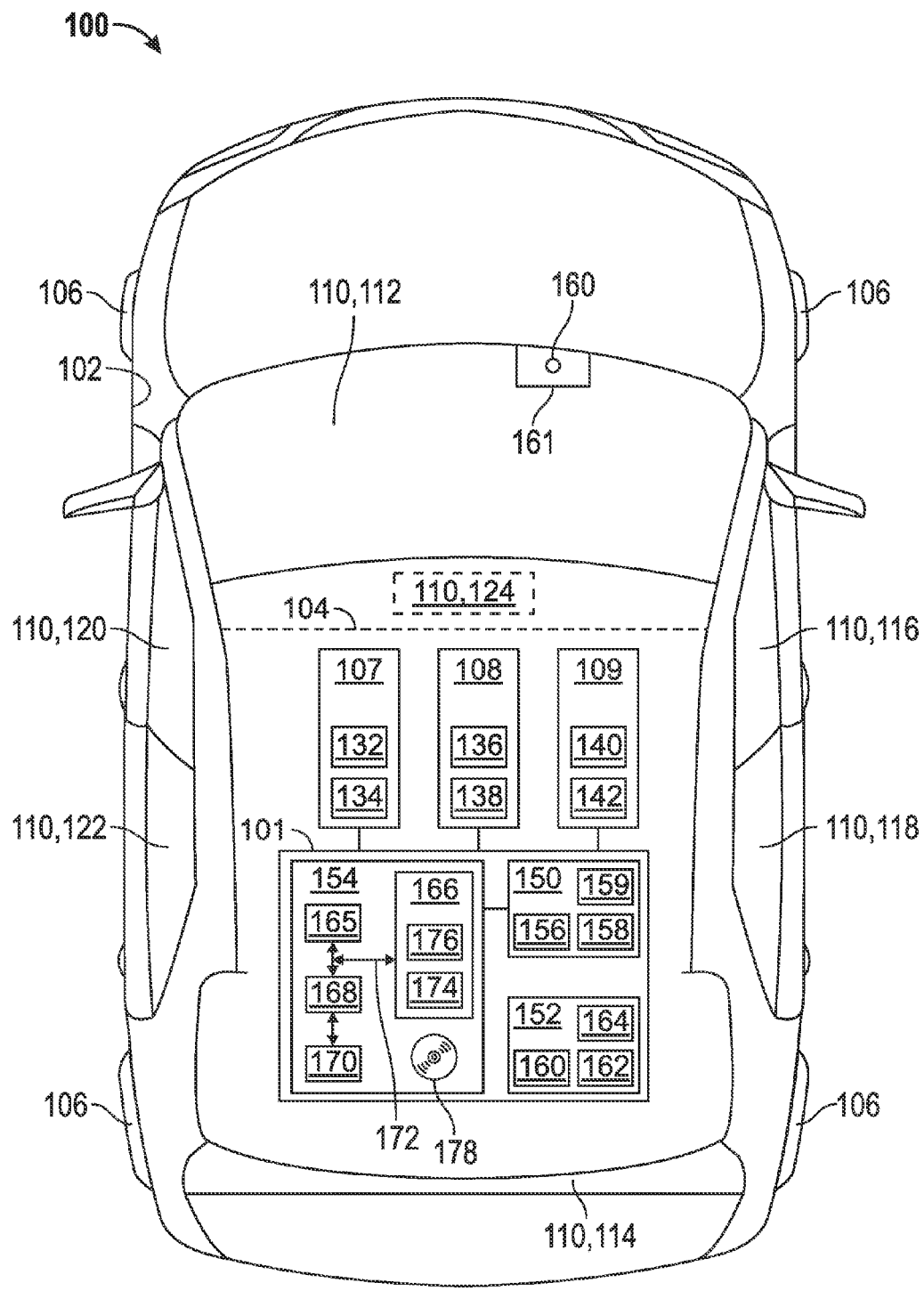
FIG. 1 is a functional block diagram of a vehicle that includes a controller that determines the presence of the sun's rays inside the vehicle, and that provides for selection of appropriate actions based on the determinations regarding the sun's rays, in accordance with an exemplary embodiment.

FIG. 1 illustrates a vehicle 100, according to an exemplary embodiment. The automotive vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

As discussed further below, the automotive vehicle 100 includes a controller 101 that determines the presence of the sun's rays inside the automotive vehicle 100. The controller 101 also provides for appropriate action(s) to be taken by one or more vehicle systems based on the detected presence of the sun's rays, also as discussed further below.

The automotive vehicle 100 includes a body 102 that is arranged on a chassis 104. The body 102 substantially encloses the other components of the automotive vehicle 100. The body 102 and the chassis 104 may jointly form a frame. A plurality of transparent surfaces 110, preferably each comprising a glass material, are formed on the body 102. In the depicted embodiment, the transparent surfaces 110 include a front windshield 112, a rear windshield 114, a passenger's side front window 116, a passenger's side rear window 118, a driver's side front window 120, a moon roof 124, and a driver's side rear window 122.

As depicted in FIG. 1, the automotive vehicle 100 also includes a plurality of wheels 106, a drive system 107, an environmental control system 108, and one or more vehicle entertainment and/or information (hereinafter referred to as "infotainment") systems 109. The wheels 106 are each rotationally coupled to the chassis 104 near a respective corner of the body 102 to facilitate movement of the automotive vehicle 100. In a preferred embodiment, the automotive vehicle 100 includes four wheels, although this may vary in other embodiments (for example for trucks and certain other automotive vehicles).

The drive system 107 is mounted on the chassis 104, and drives the wheels 106. The drive system 107 preferably comprises a propulsion system. In certain exemplary embodiments, the drive system 107 comprises a combustion engine 132 and/or an electric motor/generator, coupled with a transmission 134 thereof. In certain embodiments, the drive system 107 may vary, and/or two or more drive systems 107 may be used. By way of example, the automotive vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

The environmental control system 108 uses outside air to heat and cool the automotive vehicle 100. In a preferred embodiment, the environmental control system 108 comprises an air conditioning/heating system for the automotive vehicle 100. In addition, in one exemplary embodiment, the environmental control system 108 comprises a compressor 136 and a heat exchanger 138.

The vehicle infotainment systems 109 provide information and/or entertainment for a driver and/or other occupants of the vehicle. In the depicted embodiment, the vehicle infotainment systems 109 include a navigation system and a video entertainment system, each having respective display screens 140, 142.

The controller 101 is coupled to the drive system 107, the environmental control system 108, and the one or more infotainment systems 109. The controller 101 determines the presence of the sun's rays at various locations of interest inside the vehicle, and controls various vehicle actions via the drive system 107, the environmental control system 108, and the one or more infotainment systems 109 based on the detected presence of the sun's rays. The controller 101 preferably performs these and other functions in implementing the steps of the process 200 described further below in connection with FIGS. 2-8.

As depicted in FIG. 1, the controller 101 is preferably disposed inside the body 102 of the automotive vehicle, and includes a communication system 150, a sensor array 152, and a computer system 154. The communication system 150 receives information pertaining to the automotive vehicle 100, preferably including information as to the geographic location of the automotive vehicle 100, the current time or day and the current day of the year, and the current heading of the automotive vehicle 100. In the depicted embodiment, the communication system 150 comprises a global communication system (GPS) having a transmitter 156, a receiver 158, and an antenna 159, and communicates via a wireless communication network (not depicted).

The sensor array 152 includes one or more solar sensors 160. In a preferred embodiment, one or more solar sensors 160 are disposed on or above an instrument panel 161 in a front portion inside the automotive vehicle 100 proximate the front windshield 112. the solar sensors 160 measure the presence and intensity of the sun's rays against the front portion and/or other points of interest inside the automotive vehicle 100. In certain embodiments, the sensor array 152 also includes an ambient temperature sensor 162 and/or one or more other sensors 164, preferably disposed inside the body 102 of the automotive vehicle 100. The various sensors of the sensor array 152 provide signals and/or information pertaining to the measurement of the sun's rays to the controller 101 for processing and for use in determining and acting upon the presence of the sun's rays inside the automotive vehicle 100.

In the depicted embodiment, the computer system 154 includes a processor 165, a memory 166, an interface 168, a storage device 170, and a bus 172. The processor 165 performs the computation and control functions of the controller 101, and may comprise any type of processor or multiple processors, single integrated circuits such as a microprocessor, or any suitable number of integrated circuit devices and/or circuit boards working in cooperation to accomplish the functions of a processing unit. During operation, the processor 165 executes one or more programs 174 contained inside the memory 166 and, as such, controls the general operation of the controller 101 and the computer system 154, preferably in executing the steps of the processes described herein, such as the steps of the process 200 described further below in connection with FIGS. 2-8.

The memory 166 can be any type of suitable memory. This would include the various types of dynamic random access memory (DRAM) such as SDRAM, the various types of static RAM (SRAM), and the various types of non-volatile memory (PROM, EPROM, and flash). The bus 172 serves to transmit programs, data, status and other information or signals between the various components of the computer system 154. In a preferred embodiment, the memory 166 stores the above-referenced program 174 along with one or more stored values 176 for use in determining the sun's rays inside the automotive vehicle 100. In certain examples, the memory 166 is located on and/or co-located on the same computer chip as the processor 165.

The interface 168 allows communication to the computer system 154, for example from a system driver and/or another computer system, and can be implemented using any suitable method and apparatus. It can include one or more network interfaces to communicate with other systems or components. The interface 168 may also include one or more network interfaces to communicate with technicians, and/or one or more storage interfaces to connect to storage apparatuses, such as the storage device 170.

The storage device 170 can be any suitable type of storage apparatus, including direct access storage devices such as hard disk drives, flash systems, floppy disk drives and optical disk drives. In one exemplary embodiment, the storage device 170 comprises a program product from which memory 166 can receive a program 174 that executes one or more embodiments of one or more processes of the present disclosure, such as the steps of the process 200 of FIGS. 2-8, described further below. In another exemplary embodiment, the program product may be directly stored in and/or otherwise accessed by the memory 166 and/or a disk (e.g., disk 178), such as that referenced below.

The bus 172 can be any suitable physical or logical means of connecting computer systems and components. This includes, but is not limited to, direct hard-wired connections, fiber optics, infrared and wireless bus technologies. During operation, the program 174 is stored in the memory 166 and executed by the processor 165.

It will be appreciated that while this exemplary embodiment is described in the context of a fully functioning computer system, those skilled in the art will recognize that the mechanisms and processes of the present disclosure are capable of being distributed as a program product with one or more types of non-transitory computer-readable signal bearing media used to store the program and the instructions thereof and carry out the distribution thereof, such as a non-transitory computer readable medium storing the program and containing computer instructions stored therein for causing a computer processor (such as the processor 165) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 154 may also otherwise differ from the embodiment depicted in FIG. 1, for example in that the computer system 154 may be coupled to or may otherwise utilize one or more remote computer systems and/or other control systems.

Figure 2:
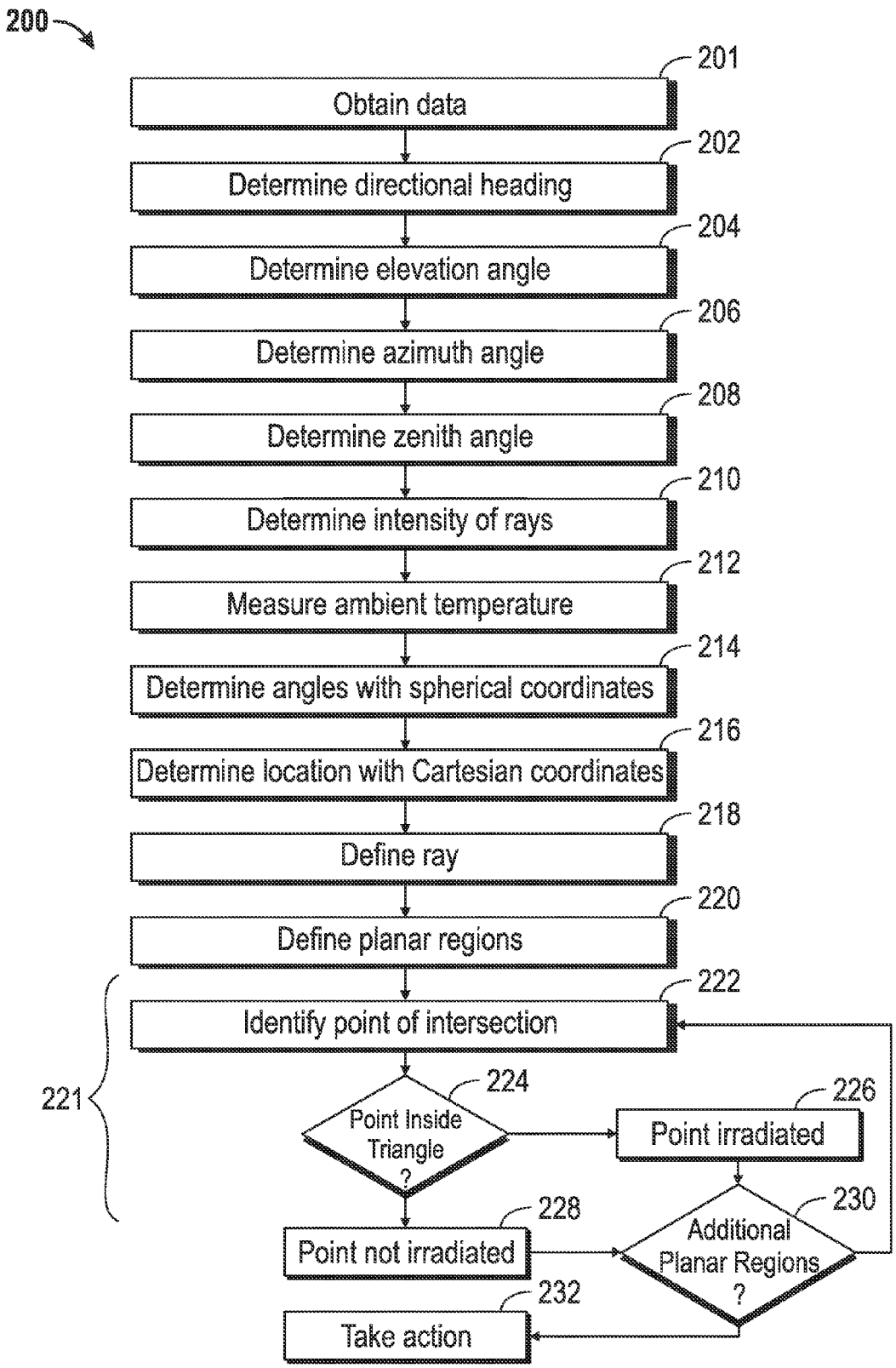
FIG. 2 is a flowchart of a process for determining the presence of the sun's rays inside the vehicle and providing appropriate actions based on the determinations regarding the sun's rays, and that can be used in connection with the vehicle and the controller of FIG. 1, in accordance with an exemplary embodiment.

FIG. 2 is a flowchart of a process 200 for determining the sun's rays inside a vehicle, and for providing appropriate action based upon such determinations. The process 200 can be utilized in connection with the vehicle 100 and the controller 101 of FIG. 1. The process 200 will also be discussed below with reference to FIGS. 2-8, which depict illustrative exemplary information pertaining to various steps of the process 200.

As depicted in FIG. 2, the process 200 begins with the step of obtaining data (step 201). In one embodiment, the data of step 201 is obtained from a remote processor (for example, a solar sensor with processing capabilities), and may include measures of intensity of the sun's rays as well as elevation, zenith and/or azimuth angles of the sun. In another embodiment, the data of step 201 comprises communications data that includes geographic information as to a current geographic location of the vehicle (including a longitude and a latitude of the vehicle on the Earth), time information as to a current time of day, and date information as to a current day of the present year. The communications data is preferably obtained by the communication system 150 of FIG. 1 (preferably, a GPS system) and provided to the processor 165 of FIG. 1 for processing.

In addition, a directional heading of the vehicle (for example, North, South, East, West, or directions in between) is determined (step 202). The directional heading is preferably determined by the processor 165 using communications data (for example, from a compass or a GPS system), such as the communications data referenced above in connection with step 201.

An elevation angle (h) of the sun (described in greater detail further below) is determined (step 204). In one embodiment, the elevation angle is part of the data from step 201. In another embodiment, the elevation angle is determined by the processor 165 of FIG. 1 based on the data from step 201 (specifically, from the geographic information, the time information, and the date information from step 201). In one such embodiment, the elevation angle is preferably determined based on the sun's known (or approximate) elevation at the vehicle's particular geographic location and at the present date and time, for example based upon a look-up table and/or other stored values 176 stored in the memory 166 of FIG. 1.

An azimuth elevation angle (A) of the sun (described in greater detail further below) is also determined (step 206). In one embodiment, the azimuth angle is part of the data from step 201. In another embodiment, the azimuth angle is determined by the processor 165 of FIG. 1 based on the data from step 201 (specifically, based on the geographic information, the time information, and the date information of step 201, along with the heading determined in step 202). Specifically, the azimuth angle is preferably determined based on the sun's known elevation at the particular geographic location, date, and time for the vehicle at the present time, given the current heading of the vehicle, for example based on a look-up table and/or other stored values 176 stored in the memory 166 of FIG. 1.

In addition, in certain embodiments, a zenith angle (z) (described in greater detail further below) is also determined (step 208). In one embodiment, the zenith angle is part of the data from step 201. In another embodiment, the zenith angle is determined by the processor 165 of FIG. 1 based on the data from step 201 (specifically, based on the geographic information, the time information, and the date information obtained in step 201).

In certain embodiments, a presence and intensity of the sun's rays on the vehicle is also determined (step 210). In one embodiment, the intensity of the sun's rays is determined based on measured values from one or more solar sensors 160 of FIG. 1. The intensity may also be part of the data obtained in step 201, as described above. In one embodiment, the communications data, the vehicle heading, the elevation angle, the azimuth angle, the zenith angle, and the intensity of steps 201-210 are obtained, generated, and/or determined using techniques described in co-pending, commonly assigned U.S. patent application Ser. No. 11/296,987 entitled "Vehicle Position Data Enhanced Solar Sensing for Vehicle HVAC Applications" filed on Dec. 8, 2005, and incorporated by reference herein.

In addition, in certain embodiments, an ambient temperature is measured (step 212). The ambient temperature preferably comprises a temperature inside a passenger cabin of the vehicle inside the automotive vehicle 100 of FIG. 1. In one embodiment, the ambient temperature is preferably measured by the ambient temperature sensor 162 of FIG. 1, and values representative thereof are preferably provided to the processor 165 of FIG. 1 for processing. The ambient temperature may also be part of the data from step 201.

Figure 3:
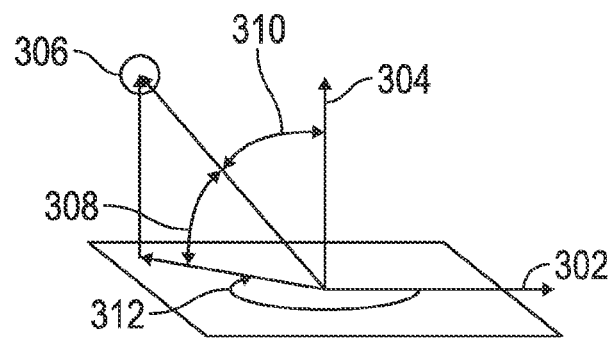
FIGS. 3-8 provide graphical illustrations of exemplary implementations of certain steps of the process of FIG. 2, in accordance with an exemplary embodiment.

The elevation angle of step 206 and the azimuth angle of step 208 are determined using a spherical coordinate system (step 214). Step 214 is preferably performed by the processor 165 of FIG. 1. With reference to FIG. 3, a first axis 302 is depicted facing North, and a second axis 304 is depicted facing in an upward or vertical direction (with respect to the vehicle). FIG. 3 also includes a reference point 306 for the sun. In addition, FIG. 3 depicts the elevation angle (h) (denoted with reference numeral 308 in FIG. 3), the azimuth angle (A) (denoted with reference numeral 312 in FIG. 3), and a zenith angle (z) (denoted with referenced numeral 310 in FIG. 3). The elevation angle (h) is preferably measured in a upward direction from the horizon. The zenith angle (z) is preferably measured form the vertical direction, or second axis 304. The azimuth angle (A) is preferably measured clockwise from the North direction, or first axis 302.

Figure 4:
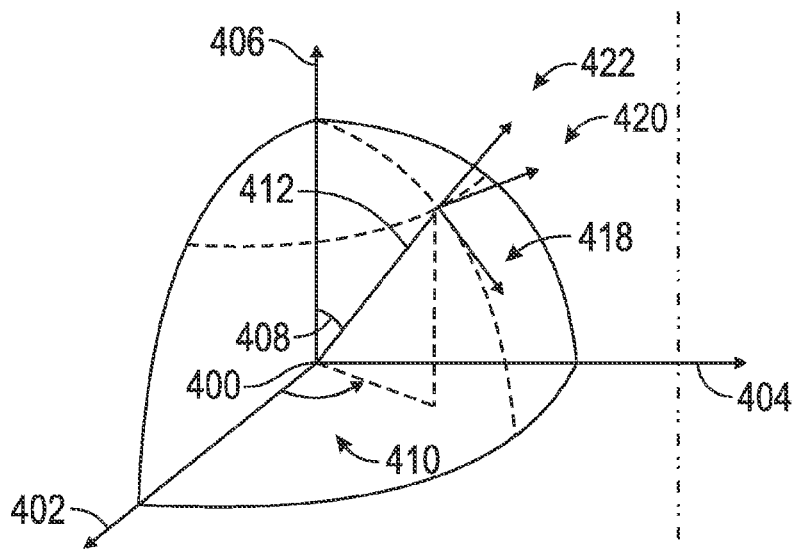
Figure 5:
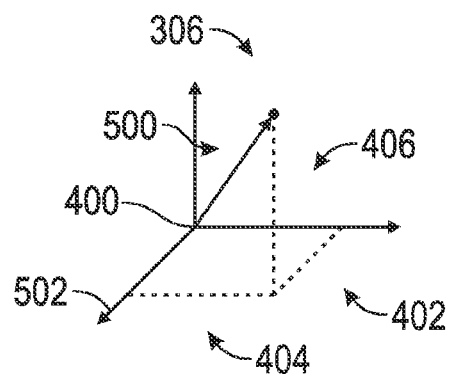

With reference to FIG. 4, a spherical coordinate system is depicted that includes an x-axis 402, a y-axis 404, and a z-axis 406. The x-axis preferably points in a direction of a current heading of the vehicle as determined in step 202. The origin 400 of the spherical coordinate system comprises a point inside the vehicle (such as a location of a vehicle occupant or of a display screen for an infotainment device) which a determination is needed as to whether such a point of interest inside the vehicle is irradiated by the sun's rays.

The position of the sun is determined in the local spherical coordinate system of FIG. 4 with the following three coordinates $(r, \theta, \phi)$. Coordinate r is represented by numerical value 422 in FIG. 4. Also as depicted in FIG. 4, angle 418 ($\hat{\theta}$) represents the "local East" direction, and angle 420 ($\hat{\phi}$) represents the "local North" direction, in this coordinate system. Coordinate $\theta$ is represented by reference numeral 408 in FIG. 4, and is calculated using the following equation:

$$\theta = 90 - h \qquad \text{(Equation 1)},$$

in which h represents the elevation angle, described above in FIG. 3. Coordinate $\phi$ is represented by reference numeral 410 in FIG. 4, and is calculated using the following equation:

$$\phi = 360 - A \qquad \text{(Equation 2)},$$

in which A represents the azimuth angle, described above in FIG. 3.

The location of the sun is then determined using a Cartesian coordinate system (step 216). Specifically, with reference to FIG. 5, the three coordinates (r, θ, φ) of the reference point (306) for the sun from the spherical coordinate system are determined in the Cartesian coordinate system as Cartesian coordinates (x,y,z), in which:

$$x = r \cos \phi \sin \theta \quad \text{(Equation 3)},$$

$$y = r \sin \phi \sin \theta \quad \text{(Equation 4), and}$$

$$z = r \cos \theta \quad \text{(Equation 5)}.$$

Step 216 is preferably performed by the processor 165 of FIG. 1.

A ray is defined from the point of interest (referred to above in step 214) inside the vehicle toward the sun (step 218). The ray is designated with reference numeral 500 in FIG. 5. The ray preferably takes the form of the following equation:

$$\frac{X}{L} = \frac{Y}{M} = \frac{Z}{N} = k, \quad \text{(Equation 6)}$$

in which:

$$L = \frac{x}{\sqrt{x^2 + y^2 + z^2}} = \cos\varphi * \sin\theta, \quad \text{(Equation 7)}$$

$$M = \frac{y}{\sqrt{x^2 + y^2 + z^2}} = \sin\varphi * \sin\theta, \text{ and} \quad \text{(Equation 8)}$$

$$N = \frac{z}{\sqrt{x^2 + y^2 + z^2}} = \cos\theta. \quad \text{(Equation 9)}$$

Step 218 is preferably performed by the processor 165 of FIG. 1.

Figure 6:
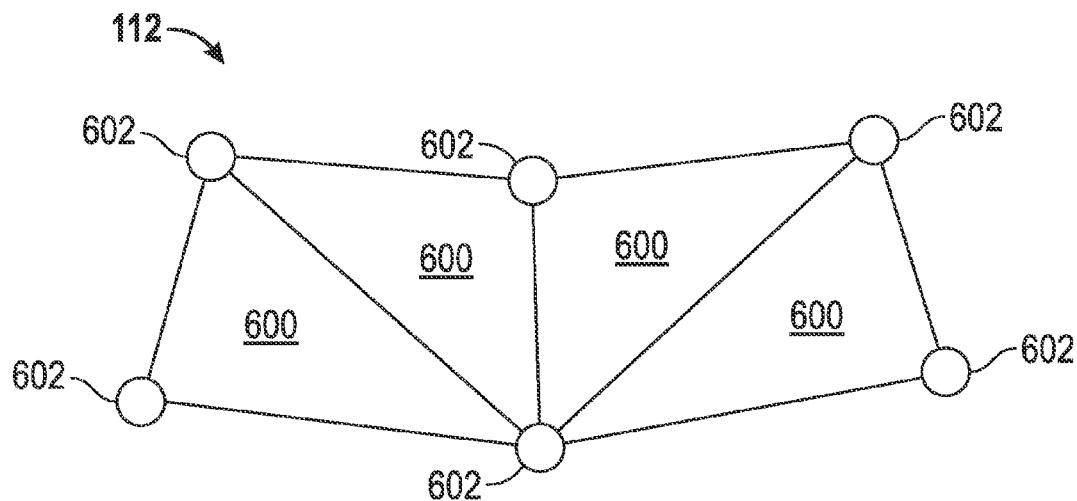
Figure 7:
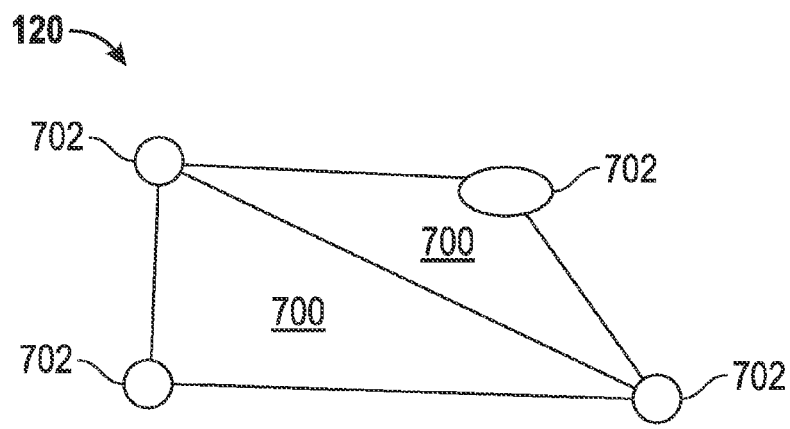
Figure 8:
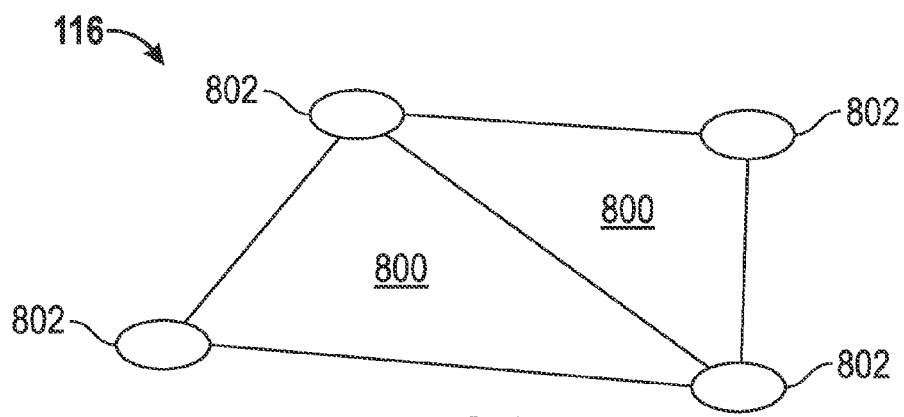

A plurality of substantially flat, bounded planar regions are defined for transparent surfaces of the vehicle (step 220). Specifically, in a preferred embodiment, each of the transparent surfaces 110 of FIG. 1 (including the front windshield 112, rear windshield 114, passenger's side front window 116, passenger's side rear window 118, driver's side front window 120, moon roof 124, and driver's side rear window 122 of FIG. 1) are divided into respective sets of triangular regions that are substantially flat and defined by respective pluralities of boundary points. By way of illustration, FIG. 6 depicts four triangular regions 600 that are defined by a plurality of boundary points 602 along the front windshield 112. By way of further illustration, FIG. 7 depicts two triangular regions 700 that are defined by a plurality of boundary points 702 along the driver's side front window 120. Similarly, FIG. 8 depicts two triangular regions 800 that are defined by a plurality of boundary points 802 along the passenger's side front window 116. In a preferred embodiment, during step 220 such of the bounded planes are defined for each of the transparent surfaces of the vehicle 100 by the processor 165 of FIG. 1 in a three dimensional coordinate system (such as that referenced above in connection with FIG. 5) as follows:

$$f(x,y,z) = 0 \quad \text{(Equation 10)}.$$

In one embodiment, step 220 is performed by the processor 165 of FIG. 1. In certain embodiments, step 220 may be performed once and then stored as data values 176 in the memory 166 of FIG. 1. In certain other embodiments, such data values 176 from step 220 may be loaded onto the memory 166 of FIG. 1 by a manufacturer of the vehicle.

A determination is made as to whether the ray (500) of step 218 intersects one of the bounded planar regions (600, 700 or 800) of step 220 (step, or sub-process, 221). Sub-process 221 is preferably performed by the processor 165 of FIG. 1. In one embodiment, a "BaryCentric" technique, is utilized. In the embodiment of FIG. 2, step 220 comprises two steps, namely, step 222 and step 224, both of which are described below.

During step 222, a point of intersection x(x1,y1,z1) is identified between the ray (500) of step 218 and one of the planes associated with the bounded planar regions of step 220, without regard to the boundary points. In one embodiment, during step 222, the intersection point is determined by substituting x=Lk, y=Mk, z=Nk (as referenced above in connection with Equations 6-9 of this Application) in the plane equation f(x, y, z)=0 of Equation 10, with the resulting intersection point being x (x1,y1,z1).

A subsequent determination is made in step 224 as to whether the intersection point of step 222 is inside a triangle formed by the boundary points that define the particular bounded planar region. Specifically, during step 224, a determination is made as to whether the point of intersection (x) between the plane and the ray lies inside the triangle ($P_0$, $P_1$, $P_2$) defined by three adjacent points of the plane (for example, three adjacent points 602 defining a triangular region 600 of FIG. 6, three adjacent points 702 defining a triangular region 700 of FIG. 7, or three adjacent points 802 defining a triangular region 800 of FIG. 8). In one embodiment, this is performed by computing α and β, for the following equation:

$$(x - P_0) = \alpha(P_1 - P_0) + \beta(P_2 - P_0) \quad \text{(Equation 11)}.$$

The point x is determined to lie within the interior of the triangle if α, β>0 and α+β<1. If either of these conditions is not satisfied, then the point x is determined to not lie within the interior of the triangle. In certain embodiments, during step 224 a determination is also made as to whether the ray is a "back ray", that is, whether the sun's ray would first pass through the interior of the vehicle compartment before contacting the bounded planar region (as determined by the sign of "k" in the above equations, with a negative value of "k" representing a back ray). Any such back rays are filtered out, as described below in steps 226-228.

If it is determined that the intersection point is inside one of the bounded planar regions (and provided further that a ray contacting the point of interest is not a back ray as determined in step 224), then it is determined that the point of interest is being irradiated by the sun's rays via the transparent surface represented by the particular bounded planar region being analyzed (step 226). Conversely, if it is determined that the intersection point is not inside the bounded planar region (or if the only ray contacting the point of interest is a back ray as determined in step 224), then it is determined that the point of interest is not being irradiated by the sun's rays via the transparent surface represented by the particular bounded planar region being analyzed (step 228). Steps 226 and 228 are preferably performed by the processor 165 of FIG. 1.

Following step 226 or step 228, a determination is made in step 230 as to whether there are any additional bounded planar regions of step 220 to be analyzed with respect to the ray of step 218 (and the corresponding point of interest inside the vehicle). This determination is preferably made by the processor 165 of FIG. 1. If it is determined that there are additional bounded planar regions to be analyzed, then steps 222-228 repeat in various iterations until all of the bounded planar regions have been analyzed.

Once it is determined in an iteration that all of the bounded planar regions have been analyzed, appropriate action is taken based on whether the point of interest is irradiated by the sun's rays via one or more of the bounded planar regions (step 232). In one embodiment, during step 232 the operation of an environmental control system (108 in FIG. 1) is adjusted (for example by lowering the conditioned air temperature or raising the amount of conditioned airflow) based on whether the point of interest is irradiated (for example, based on whether the sun's rays are in contact with an occupant of the vehicle, such that the occupant is likely to feel relatively warmer, as compared with if the occupant is not in contact with the sun's rays), as well as other possible factors (such as the ambient temperature inside the vehicle, the intensity of the sun's rays measured by the solar sensor, or the like, as measured via one or more of the sensors of the sensor array 152 of FIG. 1). In another embodiment, during step 232 a level of brightness of a display screen of an infotainment system (109 in FIG. 1) of the vehicle is adjusted based on whether the point of interest is irradiated by rays of the sun (for example, content provided via the display screen may be brightened for easier viewing when the sun's rays are determined to be in contact with the display screen via one or more of the transparent surfaces). In yet another embodiment, the point of interest is the solar sensor (160 in FIG. 1) of the environmental control system (108 in FIG. 1), then the system can take appropriate actions if the solar sensor is shaded by the vehicle's body and cannot measure the current sun intensity (preferably, the system in this embodiment holds a time-averaged previous intensity as an input into the control system until the solar sensor becomes unshaded).

It will be appreciated that the disclosed methods, systems, and vehicles may vary from those depicted in the Figures and described herein. For example, the vehicle 100, the controller 101, and/or various components thereof may vary from that depicted in FIG. 1 and described in connection therewith. In addition, it will be appreciated that certain steps of the process 200 may vary from those depicted in FIGS. 2-8 and/or described above in connection therewith. It will similarly be appreciated that certain steps of the process described above may occur simultaneously or in a different order than that depicted in FIGS. 2-8 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

The invention claimed is:

1. A method, comprising:
obtaining information as to a current angle of the sun;
defining a ray from a point of interest inside a vehicle toward the sun using the information; and
determining, using a processor, whether the ray intersects a transparent surface of the vehicle, for use in determining whether the point of interest is irradiated by rays of the sun if the ray intersects the transparent surface.

2. The method of claim 1, wherein the transparent surface comprises a plurality of glass surfaces of the vehicle, and the method further comprises:
defining a plurality of substantially flat, bounded planar regions for the plurality of glass surfaces; wherein the step of determining whether the ray intersects the transparent surface comprises determining whether the ray intersects one of the plurality of substantially flat, bounded planar regions, for use in determining whether the point of interest is irradiated by rays of the sun if the ray intersects the transparent surface.

3. The method of claim 2, wherein
the step of defining the plurality of substantially flat, bounded planar regions comprises dividing each of the plurality of glass surfaces into respective sets of triangular regions that are substantially flat and defined by respective pluralities of boundary points; and
the step of determining whether the ray intersects one of the plurality of substantially flat, bounded planar regions comprises determining whether the ray intersects one of the sets of triangular regions.

4. The method of claim 1, wherein:
the method further comprises determining an azimuth angle and an elevation angle of the sun using the information; and
defining the ray comprises defining the ray from the point of interest inside the vehicle toward the sun using the azimuth angle and the elevation angle.

5. The method of claim 4, wherein:
the step of obtaining information as to the current angle of the sun comprises obtaining geographic information pertaining to a geographic location of the vehicle, time information as to a current time of day, and heading information as to a current heading of the vehicle using a global positioning system (GPS) device; and
the step of determining the azimuth angle and the elevation angle comprises determining the azimuth angle and the elevation angle using the geographic information, the time information, and the heading information.

6. The method of claim 4, further comprising the steps of:
determining the azimuth angle and the elevation angle in a spherical coordinate system;
determining a location of the sun in a Cartesian coordinate system; and
defining the ray based on the determination of the azimuth angle and the elevation angle in the spherical coordinate system and the determination of the location of the sun in the Cartesian coordinate system.

7. The method of claim 1, further comprising:
adjusting operation of an environmental control system of the vehicle based on whether the point of interest is irradiated by rays of the sun if the ray intersects the transparent surface.

8. The method of claim 1, further comprising:
adjusting a level of brightness of a display screen of an infotainment system of the vehicle based on whether the point of interest is irradiated by rays of the sun if the ray intersects the transparent surface.

9. A system, comprising:
a communication device configured to obtain information as to a current angle of the sun; and
a processor coupled to the communication device and configured to:
define a ray from a point of interest inside a vehicle toward the sun using the information; and
determine whether the ray intersects a transparent surface of the vehicle, for use in determining whether the point of interest is irradiated by rays of the sun when he ray intersects the transparent surface.

10. The system of claim 9, wherein the transparent surface comprises a plurality of glass surfaces of the vehicle, and the processor is further configured to:

define a plurality of substantially flat, bounded planar regions for the plurality of glass surfaces; and determine whether the ray intersects one of the plurality of substantially flat, bounded planar regions, for use in determining whether the point of interest is irradiated by rays of the sun if the ray intersects the transparent surface.

11. The system of claim 10, wherein the processor is further configured to:

define the plurality of substantially flat, bounded planar regions by dividing each of the plurality of glass surfaces into respective sets of triangular regions that are substantially flat and defined by respective pluralities of boundary points; and determine whether the ray intersects one of the plurality of substantially flat, bounded planar regions by determining whether the ray intersects one of the sets of triangular regions.

12. The system of claim 9, wherein the processor is further configured to:

determine an azimuth angle and an elevation angle of the sun using the information; and define the ray from the point of interest inside the vehicle toward the sun using the azimuth angle and the elevation angle.

13. The system of claim 12, wherein:

the communication device comprises a global positioning system (GPS) device configured to obtain geographic information pertaining to a geographic location of the vehicle, time information as to a current time of day, and heading information as to a current heading of the vehicle; and the processor is further configured to determine the azimuth angle and the elevation angle using the geographic information, the time information, and the heading information.

14. The system of claim 12, wherein the processor is further configured to:

determine the azimuth angle and the elevation angle in a spherical coordinate system;

determine a location of the sun in a Cartesian coordinate system; and define the ray based on the determination of the azimuth angle and the elevation angle in the spherical coordinate system and the determination of the location of the sun in the Cartesian coordinate system.

15. The system of claim 9, wherein the processor is further configured to adjust operation of an environmental control system of the vehicle based on whether the point of interest is irradiated by rays of the sun if the ray intersects the transparent surface.

16. A vehicle comprising:

a body;

a drive system disposed inside the body; and a controller disposed inside the body, the controller comprising:

a communication device configured to obtain information as to a current angle of the sun; and a processor coupled to the communication device and configured to:

define a ray from a point of interest inside the vehicle toward the sun using the information; and determine whether the ray intersects a transparent surface of the vehicle, for use in determining whether the point of interest is irradiated by rays of the sun if the ray intersects the transparent surface.

17. The vehicle of claim 16, wherein the transparent surface comprises a plurality of glass surfaces of the vehicle, and the processor is further configured to:

define a plurality of substantially flat, bounded planar regions for the plurality of glass surfaces; and determine whether the ray intersects one of the plurality of substantially flat, bounded planar regions, for use in determining whether the point of interest is irradiated by rays of the sun if the ray intersects the transparent surface.

18. The vehicle of claim 17, wherein the processor is further configured to:

define the plurality of substantially flat, bounded planar regions by dividing each of the plurality of glass surfaces into respective sets of triangular regions that are substantially flat and defined by respective pluralities of boundary points; and determine whether the ray intersects one of the plurality of substantially flat, bounded planar regions by determining whether the ray intersects one of the sets of triangular regions.

19. The vehicle of claim 16, wherein:

the communications device comprises a global positioning system (GPS) device configured to obtain geographic information pertaining to a geographic location of the vehicle, time information as to a current time of day, and heading information as to a current heading of the vehicle; and the processor is further configured to:

determine an azimuth angle and an elevation angle of the sun using the geographic information, the time information, and the heading information; and define the ray from the point of interest inside the vehicle toward the sun using the azimuth angle and the elevation angle.

20. The vehicle of claim 19, wherein the processor is further configured to:

determine the azimuth angle and the elevation angle in a spherical coordinate system;

determine a location of the sun in a Cartesian coordinate system; and define the ray based on the determination of the azimuth angle and the elevation angle in the spherical coordinate system and the determination of the location of the sun in the Cartesian coordinate system.

* * * * *